July 9, 1957

J. M. BENTON 2,798,969

TRANSFORMER SWITCHES

Filed Jan. 25, 1955

WITNESSES:

INVENTOR
James M. Benton.
BY
ATTORNEY

July 9, 1957     J. M. BENTON     2,798,969
TRANSFORMER SWITCHES
Filed Jan. 25, 1955     3 Sheets-Sheet 2

July 9, 1957  J. M. BENTON  2,798,969
TRANSFORMER SWITCHES
Filed Jan. 25, 1955  3 Sheets-Sheet 3
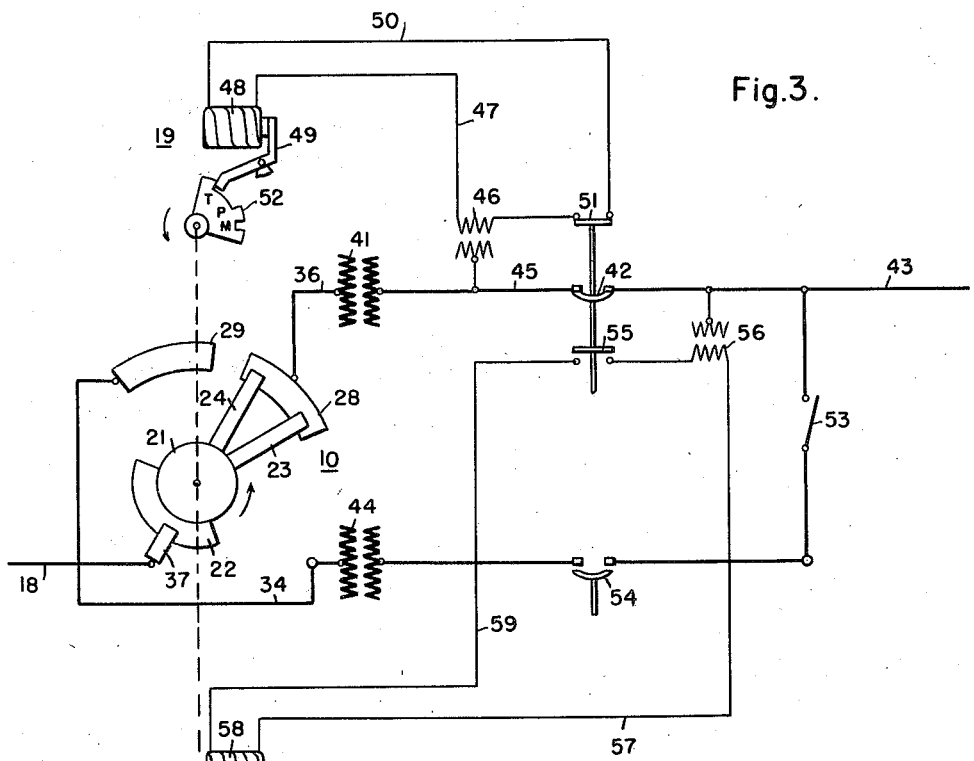
Fig. 3.
Fig. 4.

2,798,969
Patented July 9, 1957

2,798,969
TRANSFORMER SWITCHES

James M. Benton, Sharon, Pa., assignor to Westinghouse Electric Corporation, East Pittsburgh, Pa., a corporation of Pennsylvania Application January 25, 1955, Serial No. 484,003

4 Claims. (Cl. 307—64)

The invention relates, generally, to transformer switches and, more particularly, to switches for electrically connecting mobile substations to a transformer that it is desired to isolate so that it may be worked on in a deenergized condition.

The object of the invention is to provide a transformer switch that may be utilized for connecting a mobile substation into a transmission system to take a transformer load and then take the transformer off the power line without dropping the load.

It is also an object of the invention to provide for utilizing the transformer switch to effect the connection of a mobile substation to a power line, and the taking of the transformer off the line without interrupting more than a small magnetizing current by means of the transformer switch.

Other objects of the invention will, in part, be obvious and will, in part, appear hereinafter.

The invention, accordingly, is disclosed in the embodiment thereof shown in the accompanying drawings and comprises the features of construction, combination of elements, and arrangement of parts, which will be exemplified in the construction hereinafter set forth, and the scope of the application of which will be indicated in the claims.

For a fuller understanding of the nature and objects of the invention, reference should be had to the following detailed description, taken in connection with the accompanying drawings, in which:

Fig. 3 is a schematic diagram showing how the transformer switch may be utilized for connecting a transformer into a transmission system to take the load of a sub-station transformer so that it may be deenergized for repairs or removal; and Fig. 4 is a top plan fragmentary view of the actuating handle of the transformer switch.

Figure 1:
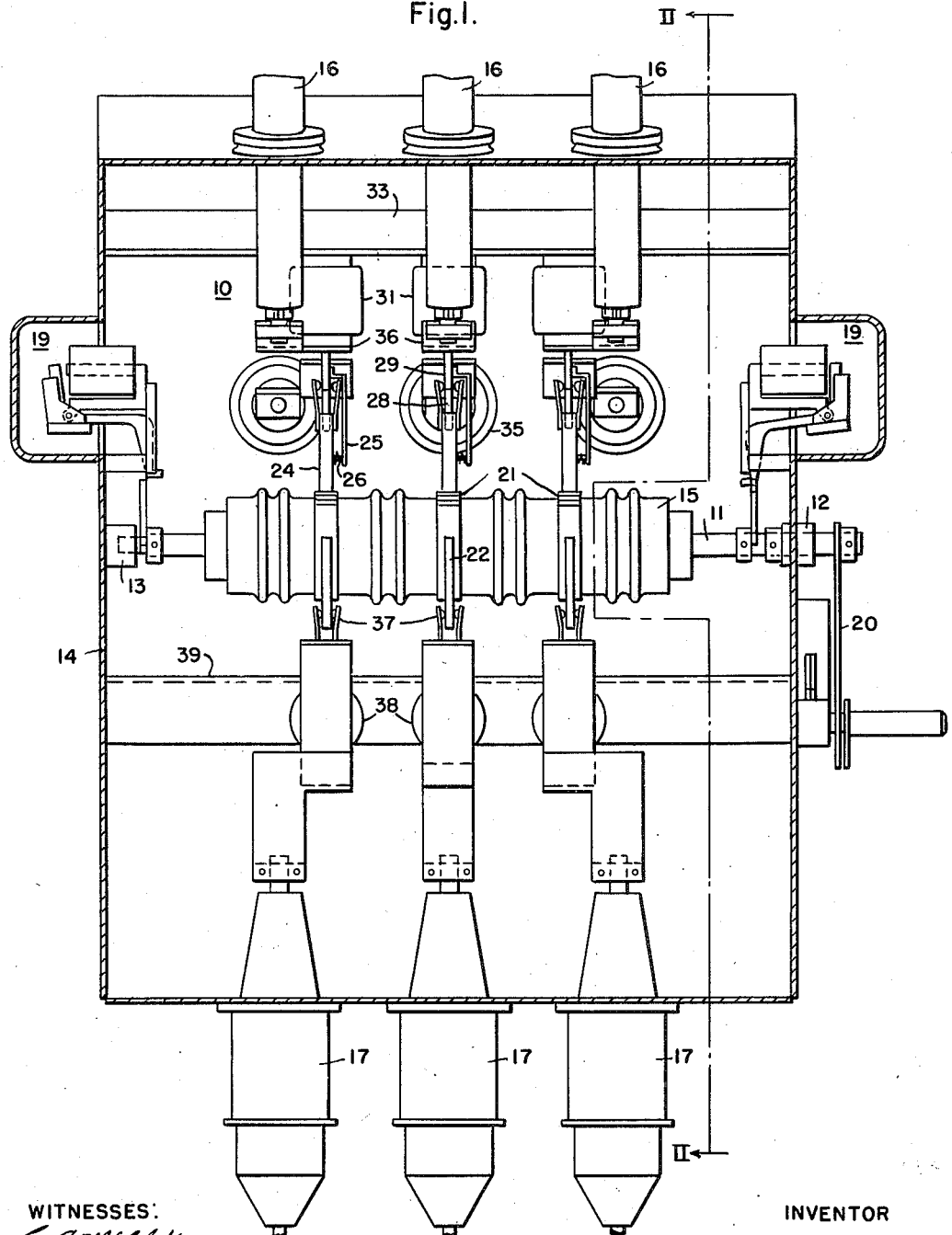
Figure 1 is a view in front elevation of a transformer switch constructed in accordance with this invention.

Referring now to the drawings and Fig. 1, in particular, the transformer switch shown, generally, at 10 is for a three-phase transformer. While in this embodiment of the invention a three-phase switch is illustrated, it is to be understood that a single-phase switch can be made without departing from the scope of the invention.

The transformer switch comprises a shaft 11 rotatably mounted in bearings 12 and 13 disposed in a switch case 14. The case will be designed for the conditions under which it is to be used; that is, it will be designed to fit on a transformer of a predetermined size and in a location where it can be readily attached without interfering with the installation of other auxiliary parts.

A porcelain bushing 15 is mounted on the shaft 11 and secured to the shaft in any well-known manner. The bushing is secured to the shaft 11 so that it may be rotated as desired. In designing the bushing, it will be made of a size and shape suitable for meeting the conditions under which it will be utilized. For example, it will be large enough to properly insulate the switch members from the shaft. Also, it will be long enough to enable the spacing of the switch members for the different phases, far enough apart that there will be no danger of break-over from one phase to another.

As shown, three-phase mobile transformer bushings 16 will be mounted in the case 14, one for each phase of the three-phase system. In this embodiment of the invention, the bushings are illustrated as of any well-known type; however, they will be selected to meet the operating conditions.

In the bottom of the casing 14 potheads 17 are disposed for connecting the switch to the transmission line 18. One pothead is provided for each conductor of the three-phase system. The switch is also provided with interlocking mechanisms shown, generally, at 19 for controlling the operation of the actuating handle 20. The operation of the interlocking mechanism, shown generally at 19, will be described in greater detail hereinafter.

Figure 2:
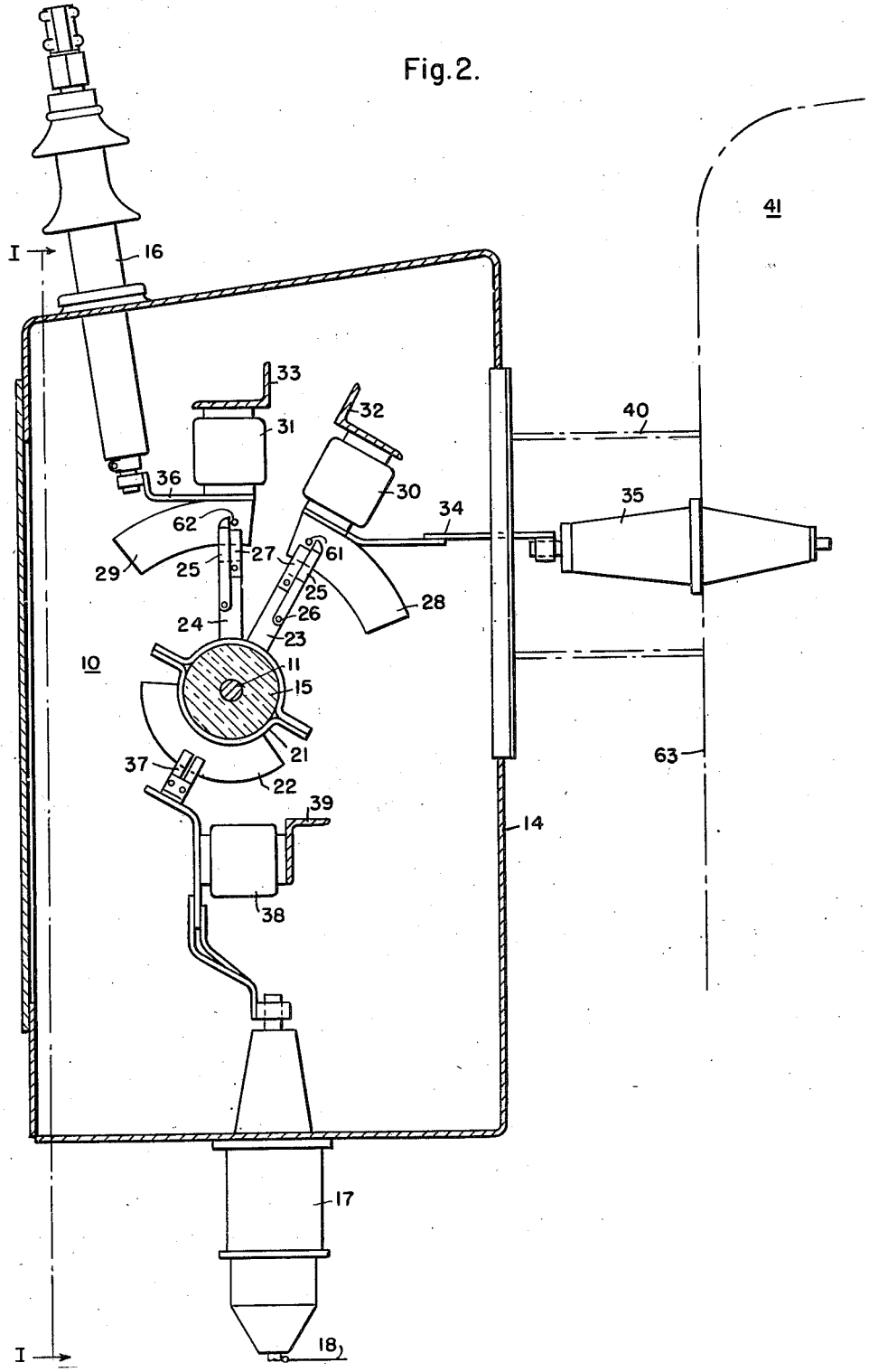
Fig. 2 is a view in end elevation along the line II—II of Fig. 1.

Referring now to Fig. 2, in particular, which illustrates the transformer switch connected into one phase of the transmission system, each phase switch comprises a clamp 21 carrying a rotary contactor section 22 and two angularly spaced switching members 23 and 24. The rotary contactor segment is an arcuate plate extending through an angle of about 50° to 60°. The thickness and depth of this plate will depend on the conditions to be met. It is sufficient to point out in this instance that it should be of some good conducting material, such as copper.

The switch members 23 and 24 are of the snap-acting variety, which are known in the art and need not be described in too great detail. It will suffice to say that in the case of the switch member 23, when the switch is actuated in the clockwise direction, the leading section 25 is pivoted at 26, while the trailing section 27 is rigidly mounted on the switch arm. The switch member 24 is similar in construction to the switch member 23, with the exception that the rigidly mounted member 27 is in the leading position, while the pivotally mounted member 25 is in the trailing position when the switch is rotated clockwise.

The switch members 23 and 24 are carried by the clamping member 21 and thereby electrically connected to one another and to the arcuate plate 22. Therefore, it is desirable that the clamping member 21 be made of some suitable conducting material. Further, the switch members 23 and 24 will also be made from some low resistance conducting material for carrying electrical current.

As illustrated, two stationary plates 28 and 29, which simulate a segment of a circle in shape, are disposed to be engaged by the switch members 23 and 24 as the shaft 11 is rotated. In this embodiment of the invention, the plates 28 and 29 extend through an angle of between 20° and 30° and are disposed in a circular path at the same distance from the axis of the shaft 11. It is desirable that the plates 28 and 29 extend through an arc sufficient to receive the two switch members 23 and 24 at the same time. The switch members 23 and 24 will be so positioned angularly that they may bridge the gap between the plates 28 and 29.

The plates 28 and 29 will be made from some conducting material, such as copper, and are mounted in any well-known manner. In this particular instance, they are supported on bushings 30 and 31, respectively. The bushings, in turn, are supported on angle irons 32 and 33, respectively, which may be bolted or welded to the case 14 in any well-known manner (not shown).

Pins 61 and 62 are provided on plates 28 and 29, respectively, and disposed to be engaged by the arms 25 of the switch members 23 and 24. The ends of the arms 25 are cam shaped and so disposed that they ride over the pins 61 and 62 when moving in one direction but engage them when moving in the other. When the switch members 23 and 24 are moving clockwise, the arm 25 carried by the switch member 24 engages pin 62 and is held until the switch arm has moved through a predetermined angle when it is released and moves off plate 29 with a snap action, thereby giving a quick break of the circuit. The arm 25 carried by switch member 24 rides over the pin 62 when rotated in a counterclockwise direction.

The arm 25 carried by the switch member 23 engages the pin 61 when rotated counterclockwise to give the snap action break of the circuit described for the arm 25 carried by the switch member 24. When the switch is rotated clockwise the cam shaped part of the arm 25 carried by the switch member 23 rides over the pin 61.

The plate 29 is electrically connected to the conductor 36 and the bushing 16. This bushing 16 receives the conductor coming from one phase of the mobile substation. The bushing may be of any well-known type capable of insulating the conductor from the mobile substation from the other parts of the equipment.

The plate 28 is, in turn, connected to a conductor 34 and through the bushing 35 to a phase of the sub-station transformer to be referred to hereinafter. The plate 22 carried by the bushing 15 and shaft 11 is connected to one phase of the incoming power line through a sliding contactor 37 which engages the plate 22. This contactor is mounted in the case 14 by means of a bushing 38 and an angle iron 39. The angle iron will be mounted in the case in any manner well known in the art.

The bushing 35 will preferably be enclosed by a throat 40 extending between the switch 10 and transformer case 63. This protects operators when the transformer switch is in a position to impose a voltage on the bushing 35.

The interlocks shown, generally, at 19 in Fig. 3 are disposed to be actuated in conjunction with the switch 10 in any well-known manner, and need not be described in detail. A function of the interlocks will appear as the operation of the switch proceeds.

Referring now to Fig. 3, the sub-station transformer 41 is connected through the breaker 42 to a distribution system 43. The incoming transmission line 18 is connected to the transformer 41 through the transformer switch 10.

The line circuit extends from line 18 through sliding contactor 37, plate 22, clamp 21, the switch members 23 and 24, plate 28, conductor 36 and bushings 35 to the sub-station transformer 41, conductor 45, circuit breaker 42 to the distribution system 43.

When the system in which the transformer is connected operates at a voltage greater than 600 volts, auxiliary transformers for supplying interlocking devices are provided. A system which is suitable for operation on a voltage of over 600 will be described.

When the transformer 41 is in service connected to the distribution system 43, a small transformer 46, which supplies current for operating the interlock system, shown generally at 19, is energized. The circuit for the interlock system may be traced as follows. Transformer 46, conductor 47, a solenoid 48 for operating a latch 49, conductor 50, the back contact 51 on the circuit breaker 42, back to the transformer 46. The solenoid 48 now stands energized, and the latch 49 engages in a notch in the plate 52, and the actuating handle of the switch 20 cannot be operated to the mobile or open-position, but only to the parallel position. When the switch is in the transformer position, the mobile transformer 44 may now be connected through the bushing 16 to the plate 29, as the bushing 16 does not carry a voltage. In addition, the mobile transformer 44 will be connected through a hotwire hook (not shown since they are well known in the art) or other means to the transmission line 43. In this schematic showing, a switch 53 is illustrated to take the place of the hot line hook.

The switch is now ready for operation to parallel the transformers 41 and 44 and finally transfer the load carried by the transformer 41 to the transformer 44. When the mobile breaker 52 is open, the switch handle 20 is moved to the parallel position, and the switch member 24 will be moved from the contact plate 28 to the contact plate 29. The mobile transformer 44 is connected in parallel with the sub-station transformer 41 by the closing of the mobile breaker.

The circuit through the sub-station transformer 41 may be traced as follows: From the incoming transmission line 18 through contactor 37, plate 22, clamp 21, switch member 23, plate 28, conductor 36, transformer 41, circuit breaker 42 to the distribution system 43. The circuit through the mobile transformer may be traced from the incoming line 18, contactor member 37, plate 22, clamp 21, switch member 24, plate 29, transformer 44, circuit breaker 54 and switch 53 to the distribution system 43.

The circuit breaker 42 in the substation may now be opened. When the breaker 42 is opened, the back contactor 55 will effect an energization of the transformer 56, the solenoid 58 and lower interlock 19 will be actuated. The circuit for the lower interlock member 19 will be from the transformer 56, conductor 57, solenoid 58, conductor 59, contact member 55 back to the transformer 56. The latch 60 of the interlock will engage in the slot marked M and P, and the handle cannot be actuated back to the transformer position. However, it can be actuated one step forward to the mobile position. When the handle is actuated forward to the mobile position, the trailing switch member 23 will be moved off the plate 28.

The snap-acting finger 25 of the switch member 23 will engage the pin 61 and be held until the switch finger 27 leaves the plate 28. Finally, when the handle has progressed far enough to draw the finger 25 under the pin 61 the spring operating the snap-acting segment 25 will be energized to the point where, when it draws the snap-acting member 25 off the plate, it will do so with a snap action effecting a quick break of the circuit connection.

It is to be noted that the load circuit through transformer 41 has been interrupted by the circuit breaker 42; therefore, the switch member 23 does not break a load circuit but only the current flowing in a light magnetizing circuit. The switch is now in mobile position, and the load circuit may be traced from line 18 through contactor 37, plate 22, clamp 21, switch members 23 and 24, plate 29, transformer 44, circuit breaker 54, hot plate connector 53 to the distribution line 43.

The transformer 41 is now completely disconnected from the line and may be worked on with safety. The lower interlock 19 will prevent the operation of the switch handle to interrupt the load circuit carried by the mobile transformer.

If the transformer 41 has been repaired, the connecting of it back into the circuit will be the reverse of the connecting of the mobile transformer to carry the load.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

I claim as my invention:

1. In a switch for connecting a mobile transformer provided with means for connecting it to a distribution system in parallel with a sub-station transformer connected between a power line and a distribution system in combination, a rotatable shaft, two angularly spaced snap-acting switch members carried by the rotatable shaft, and a plurality of contact plates disposed to be engaged by the snap-acting switch members, the contact plates being so disposed angularly that the angularly spaced snap-acting switch members may bridge them during operation, one of the contact plates being connected to the stationary transformer, the other contact plate being connected to the mobile transformer.

2. In a switch for connecting a mobile transformer in parallel with a sub-station transformer connected between a power line and a distribution system in combination, a rotatably mounted shaft, an insulating bushing carried by the shaft, angularly spaced actuating switch members disposed on the insulating bushing, and a plurality of spaced contact plates disposed to be engaged by the switch members as the shaft is rotated, one of the plates being electrically connected to the stationary transformer, the other plate being electrically connected to the mobile transformer, the snap-acting switch members being so spaced that they may bridge the gap between the plates thereby electrically connecting the stationary and mobile transformers in parallel.

3. In a swich for connecting a mobile transformer provided with means for connecting it to a distribution system in parallel with a sub-station transformer connected between a power line and a distribution system in combination, a rotatable shaft, an insulating bushing carried by the shaft, angularly spaced snap-acting switch members carried by the insulating bushing, the snap-acting switch members being electrically connected, a plurality of contact plates disposed to be engaged by the snap-acting switch members, the contact plates being so disposed angularly that the angularly spaced snap-acting switch members may bridge them during operation, one of the contact plates being connected to the stationary transformer, the other contact plate being connected to the mobile transformer, and means for electrically connecting the line to the snap-acting switch members.

4. In a switch for connecting a mobile transformer having means for connecting it to a distribution system in parallel with the power transformer connected between a power line and a distribution system in combination, a rotatable shaft, an insulating bushing carried by the rotatable shaft, angularly spaced snap-acting switch members carried by the insulating bushing, means electrically connecting the snap-acting switch members, a plurality of contact plates disposed to be engaged by the snap-acting switch members, the contact plates being so disposed angularly that the angularly spaced snap-acting switch members may bridge them during operation, one of the contact plates being connected to the stationary transformer, the other of the contact plates being connected to the mobile transformer, an arcuate-shaped conducting plate carried by the bushing and electrically connected to the snap-acting switch members, and a sliding contactor electrically connected to the power line disposed to engage the arcuate conducting plate as the bushing is rotated.

References Cited in the file of this patent

UNITED STATES PATENTS

| | | |
|---|---|---|
| 1,009,636 | Berry | Nov. 21, 1911 |
| 2,229,531 | Tornquist | Jan. 21, 1941 |